United States Patent [19]
Lee et al.

[11] Patent Number: 6,038,779
[45] Date of Patent: Mar. 21, 2000

[54] APPARATUS FOR MEASURING THICKNESS AND METHOD THEREFOR

[75] Inventors: Eung Suk Lee; Wan Hee Park; June Ho Park; Seung Bae Jung, all of Kyongsangbook-do, Rep. of Korea

[73] Assignees: Pohang Iron & Steel Co., Ltd.; Research Institute of Industrial Science & Technology, both of Rep. of Korea

[21] Appl. No.: 09/101,654

[22] PCT Filed: Nov. 15, 1996

[86] PCT No.: PCT/KR96/00203

§ 371 Date: Jul. 14, 1998

§ 102(e) Date: Jul. 14, 1998

[87] PCT Pub. No.: WO98/22778

PCT Pub. Date: May 28, 1998

[51] Int. Cl.[7] .............................. G01B 21/08; G01B 5/06; G01B 7/06

[52] U.S. Cl. .................................. 33/503; 33/1 M; 33/549

[58] Field of Search ................... 33/1 M, 503, 549–557, 33/559, 560, 613, 783, 803–805

[56] References Cited

U.S. PATENT DOCUMENTS

| | | | |
|---|---|---|---|
| 4,665,625 | 5/1987 | Ireland et al. | 33/530 |
| 4,676,649 | 6/1987 | Phillips | 33/1 M |
| 4,805,314 | 2/1989 | Hayashi et al. | 33/1 M |
| 4,852,267 | 8/1989 | Tezuka | 33/1 M |
| 5,068,972 | 12/1991 | Herzog et al. | 33/549 |
| 5,291,662 | 3/1994 | Matsumiya et al. | 33/1 M |
| 5,402,981 | 4/1995 | McMurtry | 33/503 |
| 5,426,861 | 6/1995 | Shelton | 33/503 |
| 5,467,289 | 11/1995 | Abe et al. | 364/560 |
| 5,575,075 | 11/1996 | Sasaki | 33/503 |
| 5,621,978 | 4/1997 | Sarauer | 33/503 |
| 5,778,548 | 7/1998 | Cerruti | 33/503 |
| 5,848,480 | 12/1998 | Sola et al. | 33/503 |

FOREIGN PATENT DOCUMENTS

| | | |
|---|---|---|
| 0503245 | 1/1992 | European Pat. Off. . |
| 4-116406 | of 1992 | Japan . |
| 2167862 | 6/1986 | United Kingdom . |

*Primary Examiner*—Christopher W. Fulton
*Assistant Examiner*—Quyen Doan
*Attorney, Agent, or Firm*—Webb Ziesenheim Logsdon Orkin & Hanson, P.C.

[57] ABSTRACT

An apparatus for measuring thickness and a method therefor are disclosed, in which the precision is improved, the measuring time is shortened, the reliability is upgraded, and the flatness of thickness also can be precisely measured. The apparatus for measuring thickness according to the present invention includes a test piece retaining part for retaining a test piece and for moving it along X, Y and Z axes. The apparatus further includes a sensing part having a sensor retaining part for retaining an upper sensor, and having a test piece retaining part supporting table for supporting the test piece retaining part and having a lower sensor fixed thereon. The test piece retaining part includes: an X axis carrying part capable of moving in the direction of X axis, a Y axis carrying part capable of moving in the direction of Y axis, and a Z axis carrying part capable of moving in the direction of Z axis.

9 Claims, 6 Drawing Sheets

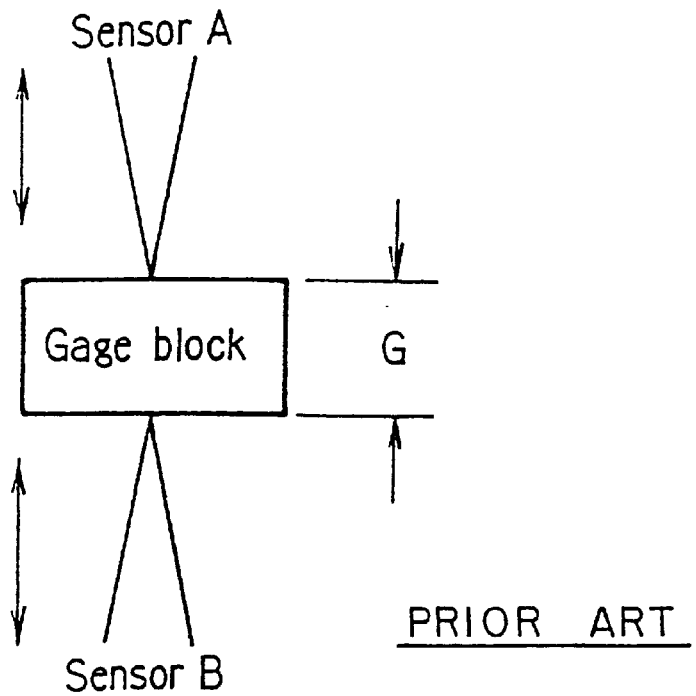
FIG. 1 (A) PRIOR ART
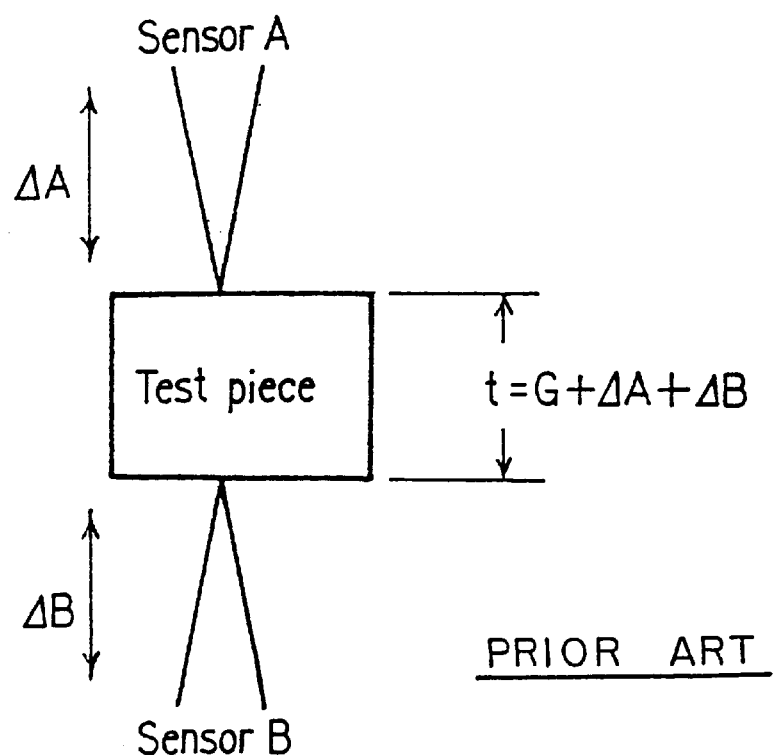
FIG. 1 (B) PRIOR ART

APPARATUS FOR MEASURING THICKNESS AND METHOD THEREFOR

FIELD OF THE INVENTION

The present invention relates to an apparatus for measuring the thickness of various steel sheets and papers, and a method therefor. In particular, the present invention relates to an apparatus for measuring thicknesses and a method therefor, in which the flatness of thickness can also be measured.

DESCRIPTION OF THE PRIOR ART

There are many methods for measuring the thickness of various steel sheets and papers precisely to $\mu$m ($\frac{1}{1000}$ mm) scale. That is, there are a method of using a micrometer, a method of using the usual measuring devices, a method of using a gage block comparator, and a method of using an on-line sheet thickness measuring apparatus.

The micrometer is used at a manufacturing site or in an inspection room. In this method, only the edge portion of a test piece can be measured, and the measurement is manually carried out. Therefore, much time is consumed in measuring the thickness, and the measurement reliability is low.

The method of using the usual thickness measuring device is utilized in automatized machine. That is, as shown in FIGS. 1(A) and (B), two sensors A and B are used upon and under the measuring points. That is, as shown in FIG. 1A, first the two distance sensors are adjusted to zero based on a reference thickness G. Then as shown in FIG. 1B, the sum addition of measuring displacements $\Delta A$ and $\Delta B$ plus the reference thickness G are calculated, thereby obtaining the thickness t ($t=G+\Delta A+\Delta B$).

In this method, however, the precision is low.

Meanwhile, the method of using the gage block comparator is based on the same principle as that of the usual thickness measuring device.

In this method however, only one point is manually measured, and therefore, the 3-dimensional contour such as the flatness of thickness for which the thickness data of the whole surface for the test piece are required cannot not be measured.

Meanwhile, the method of using the on-line sheet thickness measuring apparatus is described in Japanese Patent Laid-open No. Hei-4-116406. In this case also, the data on the test piece obtained from upper and lower distance sensors are utilized, the principle being almost same.

However, in this method, only one point can be measured, and further, the measuring precision cannot be made higher than several $\mu$m.

In all the above described methods, only one point is measured. Therefore, if the average thickness of the entire surface of a test piece is to be measured, a special apparatus is required. Particularly, in the method of using a micrometer, the central area of a test piece cannot be measured.

Further, in some cases, not only the thickness but also the flatness of thickness have to be measured precisely. The flatness of thickness cannot be measured by measuring only one point, but the entire surface of the test piece has to be measured by applying a coordinate. Further, in this case, a large number of points has to be measured, and therefore, the measuring speed has to be very fast.

SUMMARY OF THE INVENTION

In order to solve the above described problems, the present inventor carried out much study, and as a result, the present inventor has come to propose the present invention.

Therefore it is an object of the present invention to provide an apparatus for measuring thickness and a method therefor, in which the precision is improved, the measuring time is shortened, the reliability is upgraded, and flatness of thickness also can be precisely measured.

In achieving the above object, the apparatus for measuring thickness according to the present invention includes:

a test piece retaining part consisting of: an X axis carrying part for retaining a test piece and being movable along X axis; a Y axis carrying part for retaining the X axis carrying part and being movable along Y axis; and a Z axis carrying part for retaining the X axis and Y axis carrying parts and being movable along Z axis; and a test piece retaining part supporting table having a sensor retaining part for vertically movably retaining an upper sensor, and having a lower sensor fixed thereon.

In another aspect of the present invention, the method for measuring thickness according to the present invention includes the steps of:

roughly measuring a thickness Tn of a test piece by using a usual thickness measuring device, and installing the test piece on a test piece retaining frame of an X axis carrying part;

selecting a standard thickness, such as gage block having a reference thickness G and satisfying the following formula (1), and installing it on the X axis carrying part of the test piece retaining part, $$Tn-S<G<Tn+S \tag{1}$$

(where S is the maximum measuring distance of the upper and lower sensors);

making the test piece retaining part actuated so as to place a lower face of the gage block within a measuring range of a lower sensor (which is fixed to a sensor retaining part supporting table), and vertically moving an upper sensor (which is movably retained above a sensor retaining part) so as to place the upper face of the gage block within a measuring range of the upper sensor, and so as to make distances from the lower and upper sensors to the test piece resetting zero, thereby resetting the lower and upper sensors;

making the test piece retaining part actuated so as to place a pre-set first measuring point of the test piece within the measuring ranges of the upper and lower sensors, and measuring a thickness $t_{si}$ of the test piece at this point;

making the test piece retaining part actuated so as to place a pre-set next measuring point of the test piece within the measuring ranges of the upper and lower sensors, measuring the distance between the two measuring points, and measuring thicknesses of the test piece at the respective points;

calculating a difference between the measured thicknesses $t_{si}$ of the respective sensors and the reference thickness G, and measuring a thickness $t_{si}$ at each of the measuring points based on Formula (2) below, $$t_i = G + \Delta A_i + \Delta B_i \tag{2}$$

(where $\Delta A_i$ and $\Delta B_i$ are measuring displacements of the upper and lower sensors); and correcting the measured thicknesses $t_i$ of the two measuring points based on Formula (3) and (4) below, $$\theta = \arctan[(Z_i - Z_{i-1})/(X_i - X_{i-1})] \tag{3}$$

(where $\theta$ is an inclination angle of the measured test piece relative to the horizontal plane, $Z_i$ and $Z_{i-1}$ are distances between the upper sensor and the test piece at the respective measuring points, and $X_i-X_{i-1}$ is a distance between the two measuring points), $$ti_{ic}=t_i \cos \theta \qquad (4)$$

(where $t_{ic}$ is a corrected thickness), thereby measuring the final thickness $t_{ic}$ of the test piece.

In the present invention, the respective thicknesses of the test piece are measured based on Formula 2, and the measured values are corrected as described above.

That is, in the present invention, inclination angles θ and φ at the respective points along X axis and Y axis based on any one of the measured thickness values $t_i$ are utilized to correct the measured values based on Formula (5) below:

$$t_{if}=(t_i \cos \theta).\cos \phi \qquad (5)$$

where θ is an inclination angle of the test piece along X axis, and φ is an inclination angle of the test piece along Y axis. Thus the step of measuring the final test piece thicknesses $t_{if}$ at the respective points is included.

BRIEF DESCRIPTION OF THE DRAWINGS

The above object and other advantages of the present invention will become more apparent by describing in detail the preferred embodiment of the present invention with reference to the attached drawings in which:

FIGS. 1(A) and (B) are conceptional schematic views showing the method of measuring the thickness of a test piece based on a displacement of the sensor relative to the gage block;

DESCRIPTION OF THE PREFERRED EMBODIMENT

Figure 2:
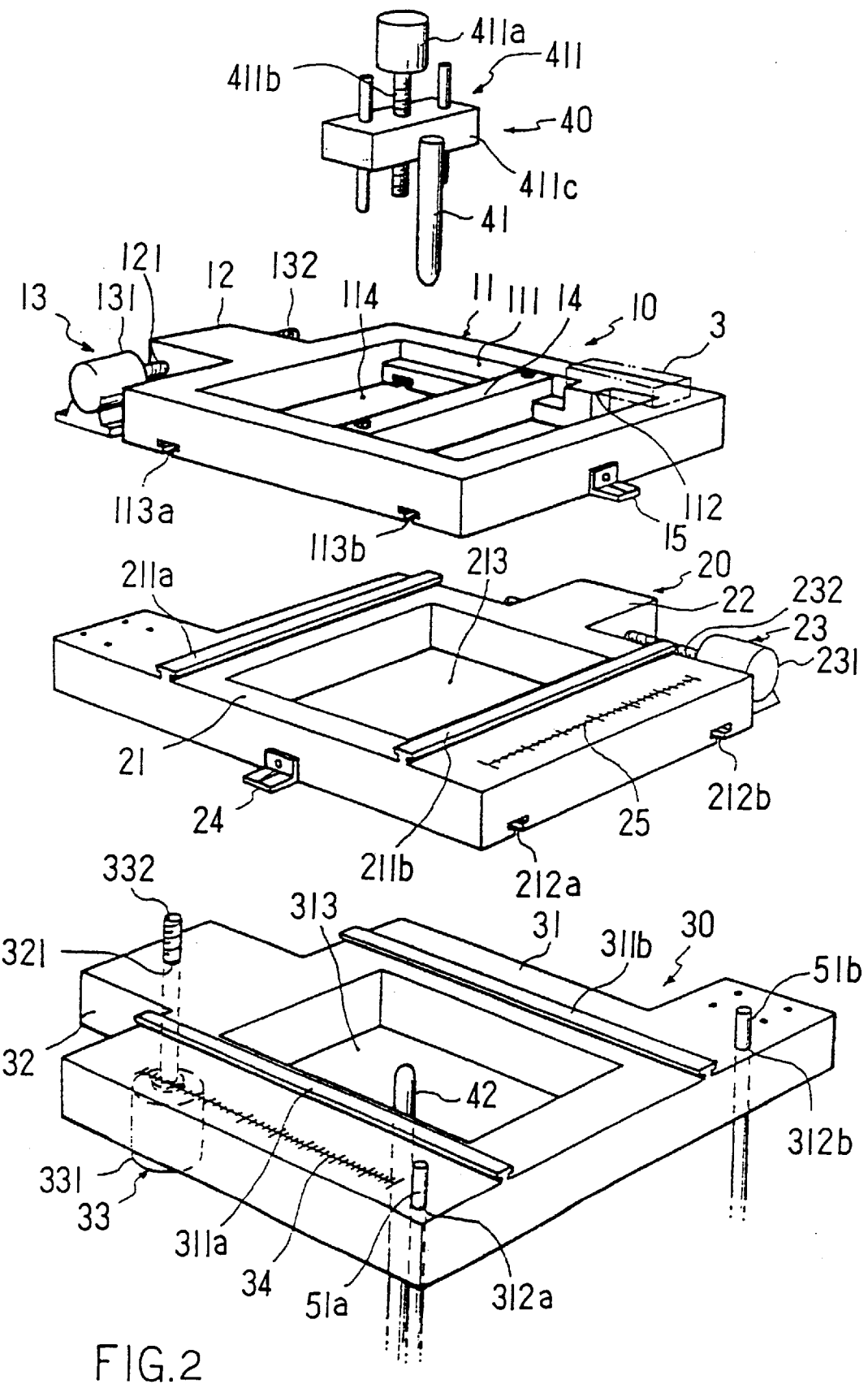
FIG. 2 is an exploded perspective view of a part of the thickness measuring apparatus according to the present invention.
Figure 3:
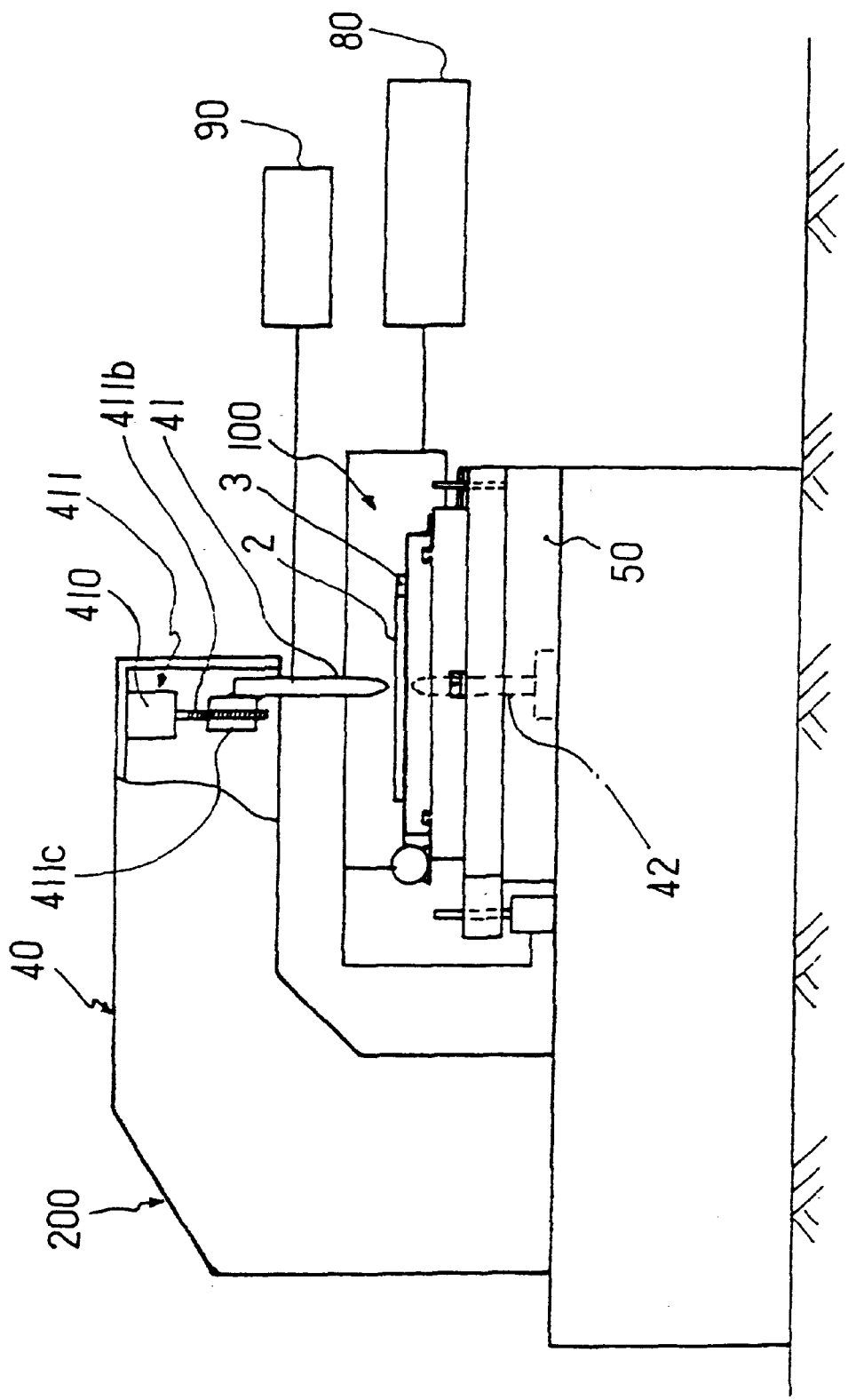
FIG. 3 is a schematic view of the thickness measuring apparatus according to the present invention.

As shown in FIGS. 2 and 3, the apparatus for measuring thickness according to the present invention includes: a test piece retaining part 100 for retaining a test piece and for moving it along X, Y and Z axes; and a sensing part 200 having a sensor retaining part 40 for retaining an upper sensor 41, and having a test piece retaining part supporting table 50 for supporting the test piece retaining part 100 and having a lower sensor 42 fixed thereon.

As shown in FIG. 2, the test piece retaining part 100 includes: an X axis carrying part 10 capable of moving in the direction of X axis, a Y axis carrying part 20 capable of moving in the direction of Y axis, and a Z axis carrying part 30 capable of moving in the direction of Z axis.

Figure 4:
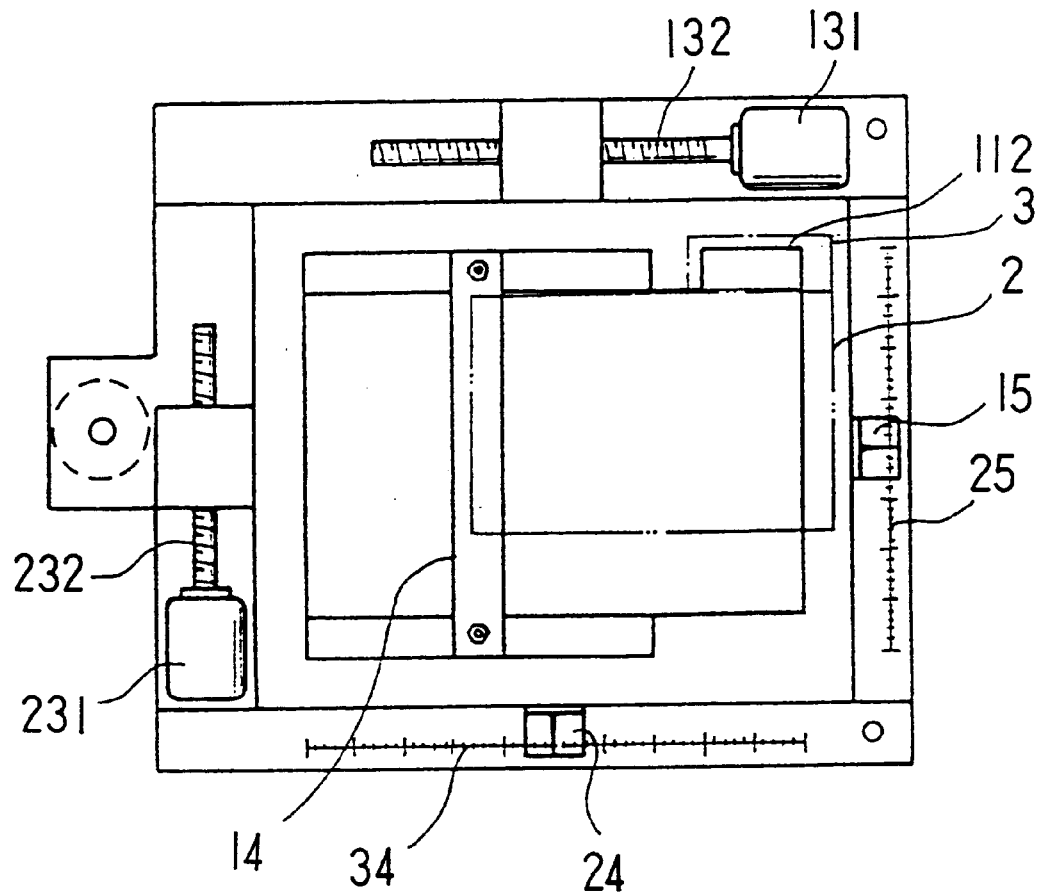
FIG. 4 illustrates the use of the thickness measuring apparatus according to the present invention.

As shown in FIGS. 2 and 4, the X axis carrying part 10 is for retaining a test piece 2 to be measured, and includes: a test piece retaining frame 11 having an X axis open space 114; an X axis expansion portion 12 formed integrally with the test piece retaining frame 11 and having an X axis screw hole 121; and a carrying device 13 for moving the X axis carrying part 10 in the direction of X axis.

The test piece retaining frame 11 includes: a gage block retaining portion 112 for retaining a gage block 3; and X axis guide grooves 113a and 113b for guiding the X axis carrying part 10 in the direction of X axis.

The test piece retaining frame 11 further includes an X axis linear scale sensor 115 for measuring the distance between two measuring points along X axis.

The X axis carrying device 13 includes: an X axis motor 131; and an X axis screw 132 threadably coupled with the X axis screw hole 121 of the X axis expansion portion 12, for moving the X axis carrying part 10 in the direction of X axis by receiving the driving force of the motor 131.

Preferably the X axis carrying part 10 should be provided with a lateral beam 14 which is disposed across the X axis open space 114, and is movable in the direction of X axis.

In the case where the lateral beam 14 is provided on the X axis carrying part 10, a pair of guide steps 111 for guiding the lateral beam 14 are formed on the test piece retaining frame 11.

Meanwhile, the Y axis carrying part 20 movably retains the X axis carrying part 10, and includes: an X axis carrying part retaining frame 21 having a Y axis open space 114; a Y axis expansion portion 22 formed integrally with the X axis carrying part retaining frame 21 and having a Y axis screw hole 221; and a Y axis carrying device 23 for moving the Y axis carrying part 20 in the direction of Y axis.

The X axis carrying part retaining frame 21 includes: a pair of X axis guides 211a and 211b coupled with the X axis guide grooves 113a and 113b, for guiding the X axis carrying part 10 in the direction of X axis; and a pair of guide grooves 212a and 212b for guiding the Y axis carrying part 20 in the direction of Y axis.

Further, the X axis carrying part retaining frame 21 includes: an X axis scale 25 and a Y axis linear scale sensor 24 for measuring the distance between two measuring points.

The Y axis carrying device 23 includes: a Y axis motor 231; and a Y axis screw 232 for being threadably coupled with the Y axis screw hole 221 to move the Y axis carrying part 20 in the direction of Y axis owing to the driving force of the Y axis motor 231.

Meanwhile, the Z axis carrying part 30 movably retains the X axis carrying part 10 and the Y axis carrying part 20 (movably in the direction of Z axis), and includes: a Y axis carrying part retaining frame 31 having a Z axis open space 114; a Z axis expansion portion 32 formed integrally with the Y axis carrying part retaining frame 31 and having a Z axis screw hole 321; and a 2 axis carrying device 33 for moving the Z axis carrying part 30 in the direction of X axis.

The Y axis carrying part retaining frame 31 includes: a pair of Y axis guides 311a and 311b coupled with the Y axis guide grooves 212a and 212b, for guiding the Y axis carrying part 20 in the direction of Y axis; and a pair of guide holes 312a and 312b for guiding the Y axis carrying part 20 in the direction of Z axis.

Further, the Y axis carrying part retaining frame 31 includes a Y axis scale 34.

The Z axis carrying device 33 includes: a Z axis motor 331; and a Z axis screw 332 for being threadably coupled with the Z axis screw hole 321 to move the Z axis carrying part 30 in the direction of Z axis owing to the driving force of the Z axis motor 331.

Meanwhile, the sensing part 200 includes: a sensor retaining part 40 for retaining the sensors; an upper sensor 41 installed movably up and down; and a lower sensor 42 fixedly installed beneath the test piece retaining part supporting table 50.

The upper sensor 41 is retained by the sensor retaining part 40 in such a manner that it can move up and down by the sensor carrying device 411.

The sensors which are used in the present invention may be of contact type or non-contact type, and the typical ones include LVDT type, laser type, capacitor type, and eddy current type.

The sensor carrying device 411 includes: a sensor moving motor 411a for furnishing a driving force to move the upper sensor 41; a sensor moving screw 411b rotated by the sensor moving motor 411a; and a sensor moving body 411c threadably coupled with the sensor moving screw 411b, and unitizingly coupled with the upper sensor 41 so as to move the upper sensor up and down owing to the driving force of the sensor moving motor 411a.

In the present invention, the sensor carrying device is not limited to that of FIG. 2, but any device may be used if it is capable of moving the upper sensor 41 up and down.

The test piece retaining part supporting table 50 is disposed between the test piece retaining part 100 and the sensor retaining part 40.

The thickness measuring apparatus according to the present invention should be preferably placed within an isothermal case (not shown in the drawings), so that the flow of the external air can be prevented, and that the ambient temperature can be maintained at a constant level.

The thickness measuring apparatus of the present invention constituted as described above can be automated by providing the usual means.

That is, as shown in FIG. 3, in order to automate the apparatus of the present invention, it is provided with a controller 80 and a calculator 90. The controller 80 controls the X axis motor 131, the Y axis motor 231, the Z axis motor 331 and the sensor moving motor 411a to furnish driving forces so as to move the X axis carrying part 10, the Y axis carrying part 20, the Z axis carrying part 30 and the upper sensor 41. The calculator 90 receives measured thickness values (measured at the respective measuring points) and a distance value between the two measuring points as sensed by linear scale sensors 15 and 24 so as to obtain the distance values between the respective measuring points based on Formula (2), and so as to obtain thickness values $t_i$ at the respective measuring points based on Formula (2). Further, the calculator 90 corrects the thickness values $t_i$ based on Formulas 3, 4 and 5, thereby obtaining the final thickness value $t_{ic}$ or $t_{if}$.

Now the method of measuring the thickness by utilizing the above described apparatus according to the present invention will be described.

As shown in FIG. 4, first the thickness of a test piece 2 is roughly measured by using a usual measuring device, and then, the test piece 2 is installed on the test piece retaining frame 11 of the X axis carrying part 10.

Under this condition, the lateral beam 14 is properly adjusted in accordance with the size of the test piece.

A gage block 3 having a reference thickness G satisfying Formula (1) is selected and installed on the gage block retaining frame 112 of the test piece retaining frame 11.

$$Tn-S<G<Tn+S \quad (1)$$

where S is the maximum measuring distance of the upper and lower sensors.

Then the X axis motor 131 of the X axis carrying device 13, the Y axis motor 231 of the Y axis carrying device 23 and the Z axis motor 331 of the Z axis carrying device 33 are activated, in such a manner that the lower face of the gage block should be placed within the measuring range of the lower sensor 42 (which is fixed on the bottom of the sensor retaining part 40).

Then the upper sensor 41 which is movably retained on down, in such a manner that the upper face of the gage block should come within the measuring range of the upper sensor 41. Then the upper and lower sensors 41 and 42 are adjusted in such a manner that the distance values between the gage block and the respective sensors should become zero.

Then the X axis motor 131, the Y axis motor 231 and the Z axis motor 331 are activated, and thus, the predetermined first measuring points of the measuring test piece are made to come respectively within the measuring ranges of the upper and lower sensors 41 and 42. At this point, the thickness $t_{si}$ of the measuring test piece is measured.

After measuring the thickness $t_{si}$ of the measuring test piece at the first measuring point, the X, Y and Z axis motors 131, 231 and 331 are driven in such a manner that the predetermined second measuring points should come within the measuring range of the upper and lower sensors 41 and 42. Then the distance between the two measuring points and the thicknesses of the respective measuring points are measured.

The distance between the two measuring points is measured in the direction of X axis and in the direction or Y axis by the X axis linear scale sensor 15.

Then differences between the reference thickness G and the measured thicknesses $t_{si}$ (measured at the respective measuring points) are calculated, and then, the thicknesses of the measuring test piece at the respective measuring points are measured based on Formula (2) below.

$$t_i=G+\Delta A_i+\Delta B_i \quad (2)$$

Figure 5:
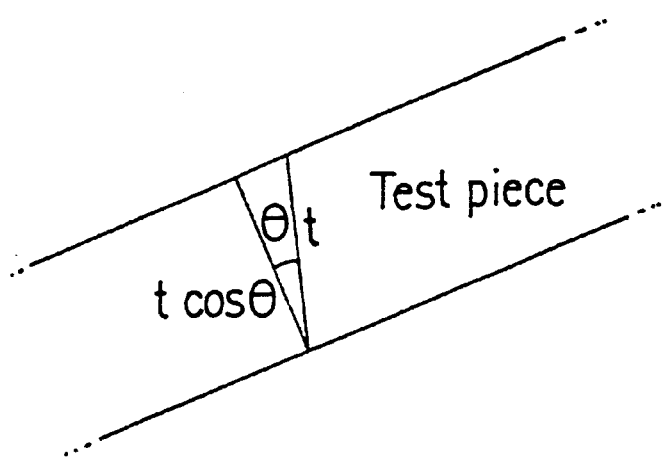
FIG. 5 illustrates a definition of the cosine errors.

Under this condition, if the test piece is not straight but is bent, the thickness is not measured in the perpendicular direction, and therefore, cosine errors are produced as shown in FIG. 5.

Figure 6:
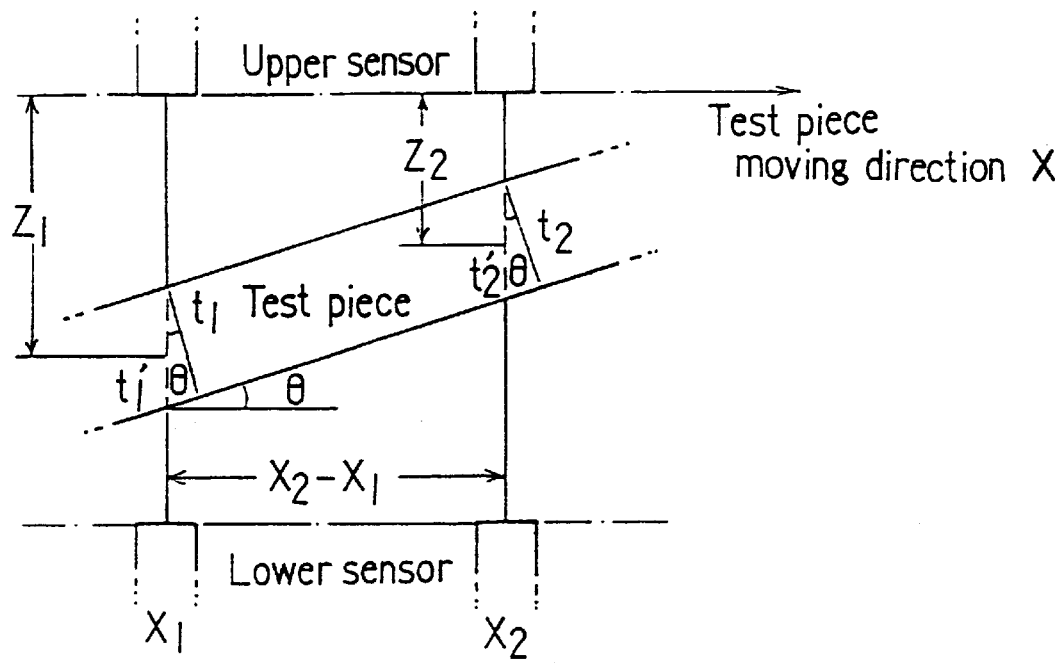
FIG. 6 illustrates a method of correcting the inclination angle of the test piece according to the present invention.

Therefore, the thickness values at the two measuring points are corrected as to their cosine errors based on Formulas (3) and (4), thereby obtaining the final thicknesses at the respective points (refer to FIG. 6).

$$\theta=\arctan [(Z_i-Z_{i-1})/(X_i-X_{i-1}) \quad (3)]$$

where $\theta$ is the inclination angle of the measuring test piece relative to the horizontal plane, $Z_i$ and $Z_{i-1}$ are distances between the upper sensor and the respective measuring points of the test piece, and $X_i-X_{i-1}$ is a distance between the two measuring points.

$$t_{ic}=t_i \cos \theta \quad (4)$$

where $t_{ic}$ is the corrected thickness.

Figure 7:
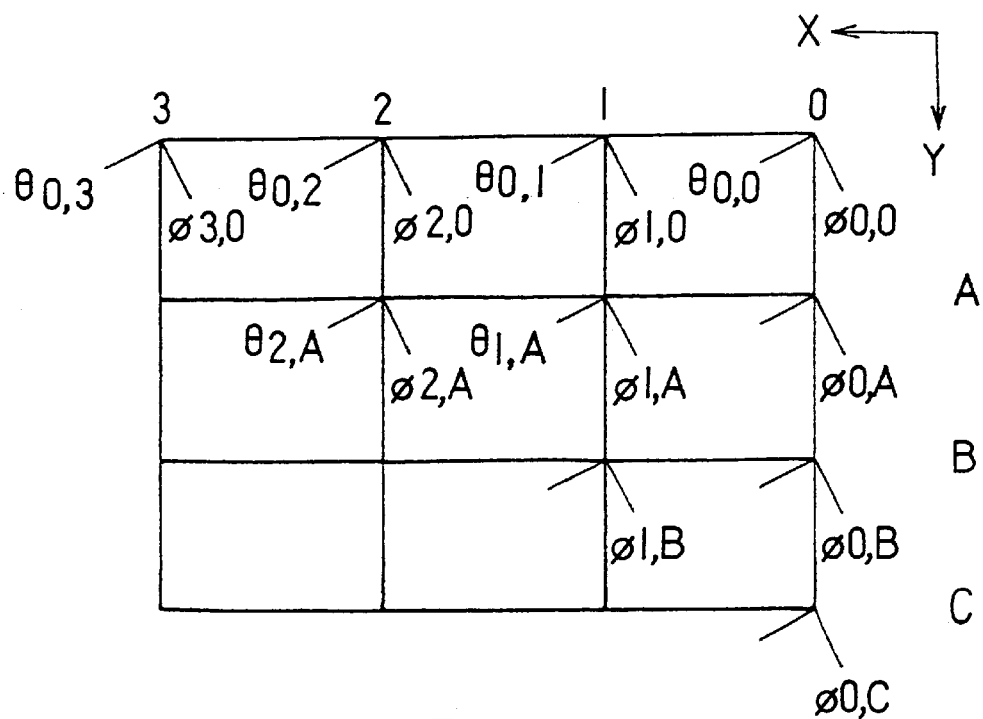
FIG. 7 illustrates a method of calculating the corrected thickness of the test piece based on a 2-dimensional inclination of the test piece at the respective measuring coordinate points according to the present invention.

After measuring the respective thicknesses of the measuring test piece based on Formula (2), corrections are made as follows. That is, by taking any one measuring point among the measured thickness values $t_i$, the inclination angles θ and φ in the directions of X and Y axes are used to carry out corrections based on Formula (5), thereby measuring the final thicknesses $t_{if}$ at the respective points (refer to FIG. 7).

$$t_{if}=(t_i \cos θ).\cos φ \quad (5)$$

where θ is the inclination angle in the direction of X axis, and φ is the inclination angle in the direction of Y axis.

Of course, the present invention can be automated by introducing an automating technique.

That is, in the present invention, the motors 131, 231, 331 and 411a can be automatically controlled by the motor controller 80. Further, the thickness values at the respective measuring points and the distance values between each pair of two measuring points are sent to the calculator 90, so that the calculator 90 can automatically measure the thicknesses $t_i$ at the respective measuring points, and that the thicknesses $t_i$ can be subjected to cosine corrections based on Formulas 3, 4 and 5, thereby obtaining the final thicknesses $t_{ic}$ or $t_{if}$ at the respective measuring points.

Now the present invention will be described based on an actual example.

EXAMPLE

A test piece having a size of 10×10 mm and a thickness of 7.0000 mm was prepared. Then thickness measurements were carried out at 25 points (5 (lateral)×5 (longitudinal)) on the test piece based on the method of the present invention. The measured results are illustrated in FIG. 8 in a graph.

The distances between the measuring points were 2 mm.

As a result, the average thickness was 7.0002 mm, and this is equivalent to an error of 0.2 μm. This shows that the precision of the measuring method according to the present invention is very high.

Figure 8:
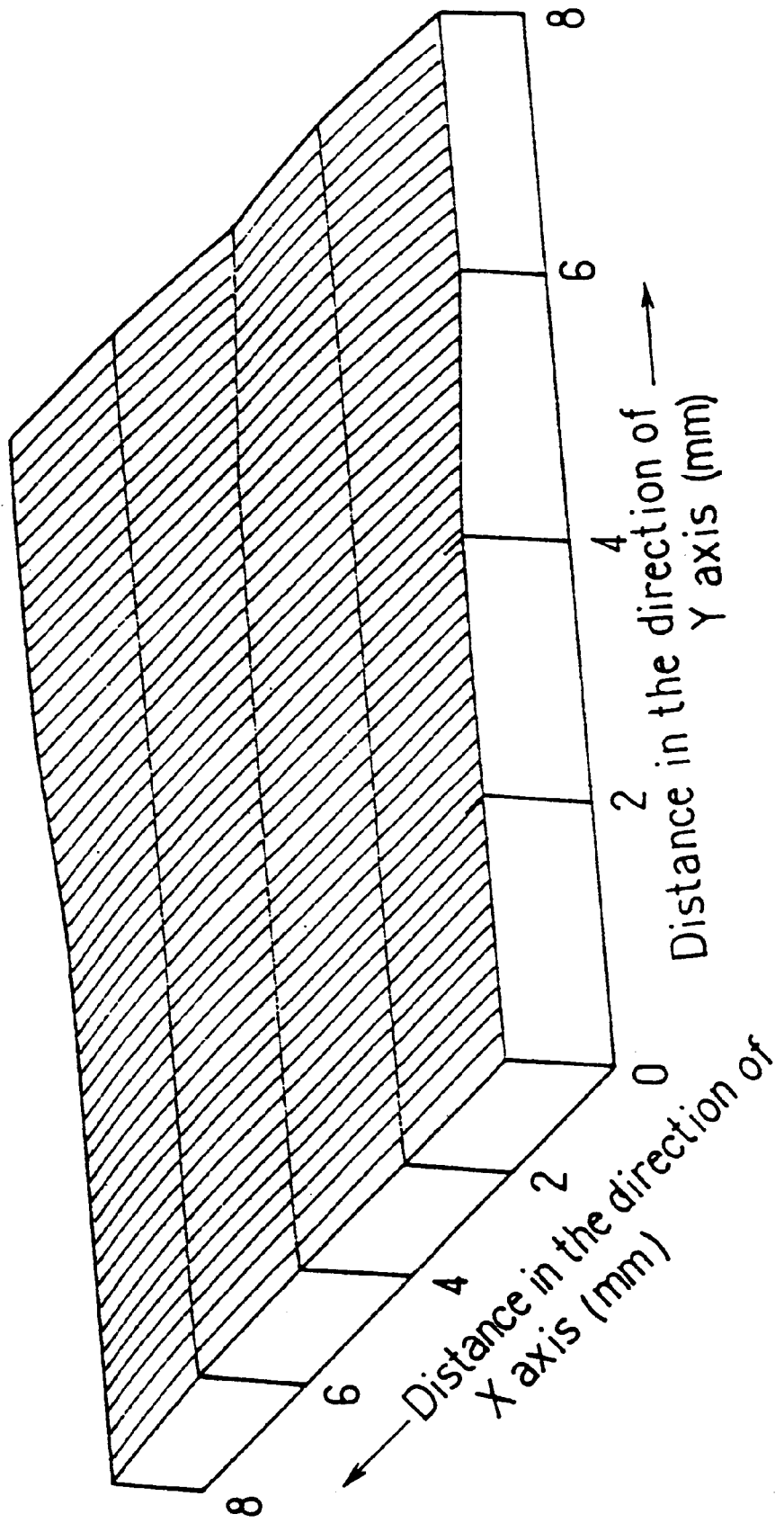
FIG. 8 illustrates a 3-dimensional graph of the test piece based on the measured thicknesses according to the present invention.

As shown in FIG. 8, it is seen that it is possible to measure the flatness of thickness based on the method of the present invention.

According to the present invention as described above, there is provided a thickness measuring apparatus in which a proper contact type or non-contact type distance sensor is used in accordance with the material of the test piece. Thus the thickness and the flatness of thickness can be measured in a speedy, precise and reliable manner.

What is claimed is:

1. An apparatus for measuring thickness, comprising:
   a test piece retaining part comprising: an X axis carrying part for retaining a test piece and capable of moving in a direction of an X axis; a Y axis carrying part for retaining said X axis carrying part and capable of moving in a direction of a Y axis; and a Z axis carrying part for retaining said Y axis carrying part and capable of moving in a direction of a Z axis;
   a sensing part comprising: a sensor retaining part for retaining an upper sensor movably up and down; and a test piece retaining part supporting table for supporting said test piece retaining part and having a lower sensor fixed thereon;
   said X axis carrying part, said Y axis carrying part and said Z axis carrying part respectively comprising: a test piece retaining frame, an X axis carrying part retaining frame and a Y axis carrying part retaining frame;
   said test piece retaining frame, said X axis carrying part retaining frame and said Y axis carrying part retaining frame respectively comprising: an X axis open space, a Y axis open space and a Z axis open space;
   said test piece retaining frame and said X axis carrying part retaining frame respectively comprising: an X axis linear scale sensor, and a Y axis linear scale sensor; and
   said X axis carrying part retaining frame and said Y axis carrying part retaining frame respectively comprising: an X axis scale and a Y axis scale corresponding with said X axis linear scale sensor and said Y axis linear scale sensor.

2. The apparatus as claimed in claim 1, wherein:
   said test piece retaining frame further comprises: a gage block retaining portion for retaining a gage block; and X axis guide grooves for guiding said X axis carrying part in a direction of the X axis;
   said X axis carrying part retaining frame comprises: a pair of X axis guides coupled with said X axis guide grooves, for guiding said X axis carrying part in a direction of the X axis; and a pair of guide grooves for guiding said Y axis carrying part in a direction of the Y axis; and
   said Y axis carrying part retaining frame comprises: a pair of Y axis guides coupled with said Y axis guide grooves, for guiding said Y axis carrying part in a direction of the Y axis; and a pair of guide holes for guiding Z axis guides formed on said test piece retaining part supporting table.

3. The apparatus as claimed in claim 1, wherein said X axis carrying part further comprises:
   a lateral beam which is disposed across said X axis open space, and is movable in a direction of the X axis; and
   a pair of guide steps formed on said test piece retaining frame, for guiding said lateral beam.

4. The apparatus as claimed in claim 1, wherein:
   said X axis carrying part further comprises: an X axis expansion portion formed integrally with said test piece retaining frame and having an X axis screw hole; and an X axis carrying device for moving said X axis carrying part in a direction of the X axis;
   said X axis carrying device comprises: an X axis motor; and an X axis screw threadably coupled with said X axis screw hole of said X axis expansion portion, for moving said X axis carrying part in a direction of the X axis by receiving driving force of said motor;
   said Y axis carrying part further comprises: a Y axis expansion portion formed integrally with said X axis carrying part retaining frame and having a Y axis screw hole; and a Y axis carrying device for moving said Y axis carrying part in a direction of the Y axis;
   said Y axis carrying device comprises: a Y axis motor; and a Y axis screw threadably coupled with said Y axis screw hole to move said Y axis carrying part in a direction of the Y axis owing to a driving force of said Y axis motor;
   said Z axis carrying part further comprises: a Z axis expansion portion formed integrally with said Y axis carrying part retaining frame and having a Z axis screw hole; and a Z axis carrying device for moving said Z axis carrying part in a direction of the Z axis;
   said Z axis carrying device comprises: a Z axis motor; and a Z axis screw threadably coupled with said Z axis screw hole to move said Z axis carrying part in a direction of the Z axis owing to a driving force of said Z axis motor; and said sensor retaining part comprises: a sensor moving motor for furnishing a driving force to move said upper sensor; a sensor moving screw rotated by said sensor moving motor; and a sensor moving body threadably coupled with said sensor moving screw, and coupled with said upper sensor so as to move said upper sensor up and down owing to a driving force of said sensor moving motor.

5. The apparatus as claimed in claim 3, wherein:

said X axis carrying part further comprises: an X axis expansion portion formed integrally with said test piece retaining frame and having an X axis screw hole; and an X axis carrying device for moving said X axis carrying part in a direction of the X axis;

said X axis carrying device comprises: an X axis motor; and an X axis screw threadably coupled with said X axis screw hole of said X axis expansion portion, for moving said X axis carrying part in a direction of the X axis by receiving driving force from said motor;

said Y axis carrying part further comprises: a Y axis expansion portion formed integrally with said X axis carrying part retaining frame and having a Y axis screw hole; and an Y axis carrying device for moving said Y axis carrying part in a direction of the Y axis;

said Y axis carrying device comprises: a Y axis motor; and a Y axis screw threadably coupled with said Y axis screw hole to move said Y axis carrying part in a direction of the Y axis owing to a driving force of said Y axis motor;

said Z axis carrying part further comprises: a Z axis expansion portion formed integrally with said Y axis carrying part retaining frame and having a Z axis screw hole; and a Z axis carrying device for moving said Z axis carrying part in a direction of the Z axis;

said Z axis carrying device comprises: a Z axis motor; and a Y axis screw threadably coupled with said Z axis screw hole to move said Z axis carrying part in a direction of the Z axis owing to a driving force of said Z axis motor; and said sensor retaining part comprises: a sensor moving motor for furnishing a driving force to move said upper sensor; a sensor moving screw rotated by said sensor moving motor; and a sensor moving body threadably coupled with said sensor moving screw, and coupled with said upper sensor so as to move said upper sensor up and down owing to a driving force of said sensor moving motor.

6. The apparatus as claimed in claim 4, further comprising:

a controller for controlling said X axis motor, said Y axis motor, said Z axis motor and said sensor moving motor; and a calculator for receiving measured thickness values which are measured at respective measuring points, and a distance value between the two measuring points as sensed by linear scale sensors so as to obtain the distance values between the respective measuring points, to obtain thickness values $t_i$ at the respective measuring points, and to correct the thickness values $t_i$, thereby obtaining final thickness values $t_{ic}$ or $t_{if}$.

7. The apparatus as claimed in claim 5, further comprising:

a controller for controlling said X axis motor, said Y axis motor, said Z axis motor and said sensor moving motor; and a calculator for receiving measured thickness values which are measured at respective measuring points, and a distance value between the two measuring points as sensed by linear scale sensors so as to obtain the distance values between the respective measuring points, to obtain thickness values $t_i$ at the respective measuring points, and to correct the thickness values $t_i$, thereby obtaining final thickness values $t_{ic}$ or $t_{if}$.

8. A method for measuring thickness, using an apparatus comprising: a test piece retaining part including X, Y and Z axis carrying parts installed movably in directions of X, Y and Z axes; and a sensing part including a sensor retaining part for retaining an upper sensor in a vertically movable manner, and a test piece retaining part supporting table having a lower sensor in a fixed state, the method comprising the steps of:

roughly measuring a thickness Tn of a test piece by using a conventional thickness measuring device, and installing the test piece on a test piece retaining frame of said X axis carrying part;

selecting a gage block having a reference thickness G and satisfying Formula (1) below, and installing it on a gage block retaining frame of said test piece retaining frame, $$Tn-S<G<Tn+S \qquad (1)$$

where S is the maximum measuring distance of the upper and lower sensors;

making said test piece retaining part actuated so as to place a lower face of said gage block within a measuring range of a lower sensor which is fixed to a sensor retaining part supporting table, and vertically moving an upper sensor which is movably retained on a sensor retaining part so as to place an upper face of said gage block within a measuring range of said upper sensor, and so as to make distances from said upper and lower sensors to the test piece zero, thereby setting said upper and lower sensors;

making said test piece retaining part actuated so as to place a pre-set first measuring point of the test piece within the measuring ranges of said upper and lower sensors, and measuring a thickness $t_{si}$ of the test piece at this point;

making said test piece retaining part actuated so as to place a pre-set next measuring point of the test piece within the measuring ranges of said upper and lower sensors, measuring a distance $(X_i-X_{i-1})$ between the two measuring points, and measuring thicknesses of the test piece at the respective points;

calculating differences between the measured thickness $t_{si}$ of the respective sensors and the reference thickness G, and measuring a thickness $t_i$ at each of the measuring points based on Formula (2) below, $$t_i=G+\Delta A_i+\Delta B_i \qquad (2)$$

where $\Delta A_i$ and $\Delta B_i$ are displacements of said upper and lower sensors; and correcting the measured thicknesses $t_i$ of the two measuring points based on Formula (3) and (4) below, $$\theta=\arctan[(Z_i-Z_{i-1})/(X_i-X_{i-1})] \qquad (3)$$

where $\theta$ is an inclination angle of the measured test piece relative to a horizontal plane, $Z_i$ and $Z_{i-1}$ are distances between said upper sensor and the test piece at the respective measuring points, and $X_i - X_{i-1}$, is a distance between the two measuring points, $$t_{ic} = t_i \cos \theta \tag{4}$$

where $t_{ic}$ is a corrected thickness, thereby measuring the final thickness $t_{ic}$ of the test piece.

9. A method for measuring thickness, using an apparatus comprising: a test piece retaining part including X, Y and Z axis carrying parts installed movably in directions of X, Y and Z axes; and a sensing part including a sensor retaining part for retaining an upper sensor in a vertically movable manner, and a test piece retaining part supporting table having a lower sensor in a fixed state, the method comprising the steps of:

roughly measuring a thickness Tn of a test piece by using a conventional thickness measuring device, and installing the test piece on a test piece retaining frame of an X axis carrying part;

selecting a gage block having a reference thickness G and satisfying Formula (1) below, and installing it on a gage block retaining frame of said test piece retaining frame, $$Tn - S < G < Tn + S \tag{1}$$

where S is the maximum measuring distance of the upper and lower sensors;

making said test piece retaining part actuated so as to place a lower face of said gage block within a measuring range of a lower sensor which is fixed to a sensor retaining part supporting table, and vertically moving an upper sensor which is movably retained above a sensor retaining part so as to place an upper face of said gage block within a measuring range of said upper sensor, and so as to make distances from said upper and lower sensors to the test piece zero, thereby setting said upper and lower sensors;

making said test piece retaining part actuated so as to place a pre-set first measuring point of the test piece within the measuring ranges of said upper and lower sensors, and measuring a thickness $t_{si}$ of the test piece at this point;

making said test piece retaining part actuated so as to place a pre-set next measuring point of the test piece within the measuring ranges of said upper and lower sensors, measuring a distance $(X_i - X_{i-1})$ between the two measuring points, and measuring thicknesses of the test piece at the respective points; calculating differences between the measured thicknesses $t_{si}$ of the respective sensors and the reference thickness G, and measuring a thickness $t_i$ at each of the measuring points based on Formula (2) below, $$t_i = G + \Delta A_i + \Delta B_i \tag{2}$$

where $\Delta A_i$ and $\Delta B_i$ are displacements of said upper and lower sensors; and taking any one of the measured thickness values $t_i$ as criterium to carry out corrections for inclination angles $\theta$ and $\phi$ in directions of X and Y axes based on Formula (5) below, $$t_{if} = (t_i \cos\theta) \cdot \cos\phi \tag{5}$$

where $\theta$ is an inclination angle of the measured test piece in a direction of X axis, and $\phi$ is an inclination angle of the test piece in a direction of Y axis, thereby measuring the final thickness $t_{if}$ of the test piece.

* * * * *

UNITED STATES PATENT AND TRADEMARK OFFICE
CERTIFICATE OF CORRECTION

PATENT NO. : 6,038,779
DATED : March 21, 2000
INVENTOR(S) : Eung Suk Lee et al.

It is certified that error appears in the above-identified patent and that said Letters Patent is hereby corrected as shown below:

Column 4 Line 58 "a 2 axis" should read --a Z axis--.

Signed and Sealed this

Twentieth Day of February, 2001

Attest:

NICHOLAS P. GODICI

Attesting Officer

Acting Director of the United States Patent and Trademark Office